US010539677B2

(12) United States Patent
Lu et al.

(10) Patent No.: US 10,539,677 B2
(45) Date of Patent: Jan. 21, 2020

(54) METHOD FOR SETTING POSITIONING MODE AND MOBILE TERMINAL

(71) Applicant: HUAWEI TECHNOLOGIES CO., LTD., Shenzhen Guangdong (CN)

(72) Inventors: Chenxi Lu, Beijing (CN); Shuiping Long, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/576,880

(22) PCT Filed: Jun. 4, 2015

(86) PCT No.: PCT/CN2015/080791
§ 371 (c)(1),
(2) Date: Nov. 27, 2017

(87) PCT Pub. No.: WO2016/192085
PCT Pub. Date: Dec. 8, 2016

(65) Prior Publication Data
US 2018/0149754 A1    May 31, 2018

(51) Int. Cl.
*G01S 19/00*    (2010.01)

(52) U.S. Cl.
CPC .................... *G01S 19/00* (2013.01)

(58) Field of Classification Search
CPC .... G01S 13/876; G01S 13/878; G01S 5/0215; G01S 5/0226; G01S 5/0289; G01S 5/14;
(Continued)

(56) References Cited

U.S. PATENT DOCUMENTS

2008/0018529 A1*  1/2008  Yoshioka ............... G01S 19/22
                                                            342/357.61
2009/0083804 A1    3/2009  Gat et al.
(Continued)

FOREIGN PATENT DOCUMENTS

CN    103364803 A    10/2013
CN    103856989 A    6/2014
(Continued)

OTHER PUBLICATIONS

Extended European Search Report issued in European Application No. 15893741.7 dated Apr. 25, 2018, 13 pages.
(Continued)

*Primary Examiner* — George Eng
*Assistant Examiner* — Jing Gao
(74) *Attorney, Agent, or Firm* — Fish & Richardson P.C.

(57) ABSTRACT

A method includes: obtaining an azimuth and a signal parameter value of each preset satellite of M preset satellites when a mobile terminal is at a first location. The M preset satellites are sorted according to the values of their azimuths and N satellite combinations are obtained from those satellites that are consecutively arranged and have signal parameter values less than preset values. In response to determining that a ratio of the quantity of the preset satellites in the first satellite combination to M is less than a first threshold, the positioning mode of the mobile terminal is set to an outdoor positioning mode. In response to determining that a ratio of the quantity of the preset satellites in the first satellite combination to M is greater than a second threshold, the positioning mode is set to an indoor positioning mode.

15 Claims, 2 Drawing Sheets

(58) Field of Classification Search
CPC .......... G01S 19/22; G01S 19/24; G01S 19/28; G01S 19/42; G01S 19/46; G01S 1/08; G01S 5/02; G01S 19/00; H04W 64/00
See application file for complete search history.

(56) References Cited

U.S. PATENT DOCUMENTS

| | | |
|---|---|---|
| 2013/0157638 A1 | 6/2013 | Malmbak et al. |
| 2014/0002307 A1 | 1/2014 | Mole et al. |
| 2014/0070991 A1* | 3/2014 | Liu .................. G01S 19/22 342/357.63 |
| 2014/0335887 A1* | 11/2014 | Liu .................. H04W 64/00 455/456.1 |
| 2015/0172870 A1 | 6/2015 | Venkatesan et al. |

FOREIGN PATENT DOCUMENTS

| | | | |
|---|---|---|---|
| CN | 104122571 A | 10/2014 | |
| CN | 104412122 A | 3/2015 | |
| EP | 1635185 A2 * | 3/2006 | ............. G01S 19/42 |
| EP | 1635185 A2 | 3/2006 | |
| JP | 2002214322 A | 7/2002 | |

OTHER PUBLICATIONS

International Search Report in International Application No. PCT/CN2015/080791, dated Mar. 8, 2016, 6 pages.

* cited by examiner

METHOD FOR SETTING POSITIONING MODE AND MOBILE TERMINAL

CROSS-REFERENCE TO RELATED APPLICATIONS

This application is a national stage of International Application No. PCT/CN2015/080791, filed Jun. 4, 2015, which is hereby incorporated by reference in its entirety.

TECHNICAL FIELD

Embodiments of the present invention relate to the field of communications technologies, and in particular, to a method for setting a positioning mode and a mobile terminal.

BACKGROUND

Multiple positioning modules that are configured to locate the mobile terminal may be integrated in a mobile terminal. The positioning modules are, for example, a Global Navigation Satellite System (English: Global Navigation Satellite System, GNSS for short) module, a wireless local area network (English: Wireless Local Area Network, WLAN for short) module, a Bluetooth module, or an inertial sensor. When the mobile terminal is located outdoors, a positioning working mode of the mobile terminal is set to an outdoor positioning working mode, and in this mode, a GNSS is used to locate the mobile terminal. When the mobile terminal is located indoors, the positioning working mode of the mobile terminal is set to an indoor positioning working mode, and in this mode, at least one of a WLAN module, a Bluetooth module, or an inertial sensor is used to locate the mobile terminal. An important technology in the positioning field is that a positioning working mode needs to be switched when a mobile terminal moves into a building from outside.

In the prior art, a mobile terminal in which a GNSS is integrated can receive satellite signals transmitted by multiple satellites. In an indoor environment, for reasons such as that the mobile terminal is blocked by a building, strength of the satellite signals received by the mobile terminal may be reduced. In this case, the mobile terminal obtains an average value of strength of all the received satellite signals. If the average value is less than a preset threshold, it may be considered that the mobile terminal is located indoors, and a positioning mode is set to an indoor positioning mode.

However, in an urban street with dense skyscrapers on both sides, satellite signals that are transmitted by satellites and that are received by a mobile terminal usually arrive after reflection, diffraction, and the like during propagation, and have relatively weak strength. As a result, the mobile terminal may incorrectly determine, according to an average value of strength, that the mobile terminal is located indoors while the mobile terminal is located outdoors, which reduces positioning accuracy.

SUMMARY

Embodiments of the present invention provide a method for setting a positioning mode and a mobile terminal, so as to reduce a probability of incorrectly determining that a mobile terminal is located indoors while the mobile terminal is located outdoors, thereby improving positioning accuracy.

According to a first aspect, a method for setting a positioning mode is provided, applied to a mobile terminal including multiple application programs, including:

obtaining an azimuth and at least one signal parameter value of each preset satellite of M preset satellites that exist when the mobile terminal is at a first location and at a first moment, where the signal parameter value includes one of a carrier-to-noise ratio of a satellite signal or strength of a satellite signal, and M is an integer greater than 1;

sorting the M preset satellites according to values of azimuths, and obtaining, from the M sorted preset satellites, N satellite combinations that are consecutively arranged and that have signal parameter values less than corresponding preset values, where N is an integer not less than 1, and each satellite combination includes at least one preset satellite;

determining a quantity of preset satellites in a first satellite combination of the N satellite combinations, where the first satellite combination is a satellite combination of the N satellite combinations that includes a largest quantity of preset satellites;

when a ratio of the quantity of the preset satellites in the first satellite combination to M is less than a first threshold, setting the positioning mode to an outdoor positioning mode; or when a ratio of the quantity of the preset satellites in the first satellite combination to M is greater than a second threshold, setting the positioning mode to an indoor positioning mode, where the first threshold is not greater than the second threshold.

With reference to the first aspect, in a first possible implementation manner of the first aspect, a preset value corresponding to a first preset satellite is greater than a preset value corresponding to a second preset satellite, the first preset satellite and the second preset satellite are any two preset satellites of the M preset satellites, and an elevation angle of the first preset satellite is greater than an elevation angle of the second preset satellite.

With reference to the first aspect or the first possible implementation manner of the first aspect, in a second possible implementation manner of the first aspect, when a quantity of first satellite combinations of the N satellite combinations is 1, the method further includes:

obtaining an azimuth range of the first satellite combination according to azimuths of the preset satellites that are consecutively arranged in the first satellite combination; and determining that a moving direction of the mobile terminal falls within the azimuth range.

With reference to the first aspect or the first possible implementation manner of the first aspect or the second possible implementation manner of the first aspect, in a third possible implementation manner of the first aspect, after the setting the positioning mode to an outdoor positioning mode or setting the positioning mode to an indoor positioning mode, the method further includes:

when a location interval between a second location and the first location is greater than a first preset distance and less than a second preset distance, and/or, a time interval between a second moment and the first moment is greater than a first time interval and less than a second time interval, obtaining at least one signal parameter value of each preset satellite of the M preset satellites that exists when the mobile terminal is at the second location and at the second moment, where the second preset distance is greater than the first preset distance, and the second preset time interval is greater than the first preset time interval; and performing, according to the at least one signal parameter value of each preset satellite of the M preset satellites that exists when the mobile terminal is at the second location and at the second moment, and an azimuth of each preset satellite of the M preset satellites that exists when the mobile terminal is at the first location and at the first moment, again a process of setting the positioning mode.

According to a second aspect, a mobile terminal is provided, including:

an obtaining unit, configured to obtain an azimuth and at least one signal parameter value of each preset satellite of M preset satellites that exist when the mobile terminal is at a first location and at a first moment, where the signal parameter value includes one of a carrier-to-noise ratio of a satellite signal or strength of a satellite signal, and M is an integer greater than 1;

a processing unit, configured to: sort the M preset satellites according to values of azimuths, and obtain, from the M sorted preset satellites, N satellite combinations that are consecutively arranged and that have signal parameter values less than corresponding preset values, where N is an integer not less than 1, and each satellite combination includes at least one preset satellite; determine a quantity of preset satellites in a first satellite combination of the N satellite combinations, where the first satellite combination is a satellite combination of the N satellite combinations that includes a largest quantity of preset satellites; when a ratio of the quantity of the preset satellites in the first satellite combination to M is less than a first threshold, set the positioning mode to an outdoor positioning mode; or when a ratio of the quantity of the preset satellites in the first satellite combination to M is greater than a second threshold, set the positioning mode to an indoor positioning mode, where the first threshold is not greater than the second threshold.

With reference to the second aspect, in a first possible implementation manner of the second aspect, a preset value corresponding to a first preset satellite is greater than a preset value corresponding to a second preset satellite, the first preset satellite and the second preset satellite are any two preset satellites of the M preset satellites, and an elevation angle of the first preset satellite is greater than an elevation angle of the second preset satellite.

With reference to the second aspect or the first possible implementation manner of the second aspect, in a second possible implementation manner of the second aspect, when a quantity of first satellite combinations of the N satellite combinations is 1, the obtaining unit is further configured to obtain an azimuth range of the first satellite combination according to azimuths of the preset satellites that are consecutively arranged in the first satellite combination; and the processing unit is further configured to determine that a moving direction of the mobile terminal falls within the azimuth range.

With reference to the second aspect or the first possible implementation manner of the second aspect or the second possible implementation manner of the second aspect, in a third possible implementation manner of the second aspect, the obtaining unit is further configured to: after the processing unit sets the positioning mode to the outdoor positioning mode or sets the positioning mode to the indoor positioning mode, when a location interval between a second location and the first location is greater than a first preset distance and less than a second preset distance, and/or, a time interval between a second moment and the first moment is greater than a first time interval and less than a second time interval, obtain at least one signal parameter value of each preset satellite of the M preset satellites that exists when the mobile terminal is at the second location and at the second moment, where the second preset distance is greater than the first preset distance, and the second preset time interval is greater than the first preset time interval; and the processing unit is further configured to perform, according to the at least one signal parameter value of each preset satellite of the M preset satellites that exists when the mobile terminal is at the second location and at the second moment, and an azimuth of each preset satellite of the M preset satellites that exists when the mobile terminal is at the first location and at the first moment, again a process of setting the positioning mode.

According to a third aspect, a mobile terminal is provided, including:

a display, one or more processors, a memory, and one or more programs, where the one or more programs are stored in the memory and configured to be performed by the one or more processors, and the one or more programs include an instruction used to perform the method provided by any one of the first aspect and the possible implementation manners of the first aspect of the present invention.

According to a fourth aspect, a computer readable storage medium storing one or more programs is provided, where the one or more programs include an instruction, and the instruction drives, when being performed by a mobile terminal including a display, the mobile terminal to perform the method provided by the first aspect and the possible implementation manners of the first aspect of the present invention.

According to the method for setting a positioning mode and the mobile terminal provided in the embodiments of the present invention, an azimuth and at least one signal parameter value of each preset satellite of M preset satellites that exist when the mobile terminal is at a first location and at a first moment are obtained; the M preset satellites are sorted according to values of azimuths, N satellite combinations that are consecutively arranged and that have signal parameter values less than preset values are obtained from the M sorted preset satellites, and a satellite combination of the N satellite combinations that includes a largest quantity of preset satellites is determined; and a ratio of a quantity of preset satellites in the satellite combination to M is compared with a first threshold and a second threshold, to determine whether the mobile terminal is located indoors or outdoors, and then a corresponding positioning mode is set. Therefore, a probability of incorrectly determining that a mobile terminal is located indoors while the mobile terminal is located outdoors is reduced, thereby improving positioning accuracy.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be noted that "first" and "second" in this specification are merely intended for distinguishing, and do not have other meanings such as an order or values. A mobile terminal involved in this specification includes, but is not limited to, a smart phone, a tablet computer, a personal digital assistant (English: Personal Digital Assistant, PDA for short), a wearable device (for example, a smart watch, or a smart band).

Figure 1:
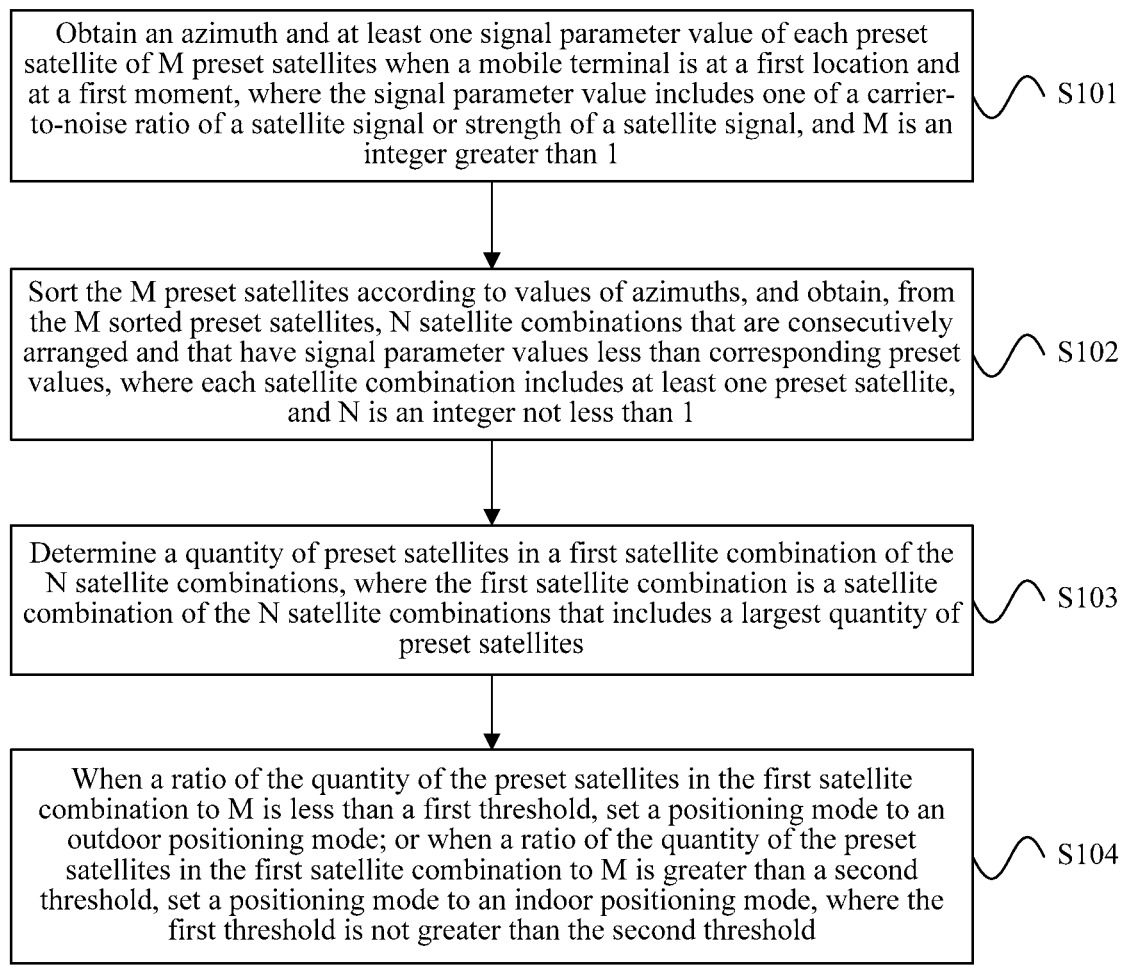
FIG. 1 is a flowchart of Embodiment 1 of a method for setting a positioning mode according to the present invention.

FIG. 1 is a flowchart of Embodiment 1 of a method for setting a positioning mode according to the present invention. As shown in FIG. 1, the method in this embodiment is applied to a mobile terminal including one or more application programs. The method may include the following steps.

S101: Obtain an azimuth and at least one signal parameter value of each preset satellite of M preset satellites when a mobile terminal is at a first location and at a first moment, where the signal parameter value includes one of a carrier-to-noise ratio of a satellite signal or strength of a satellite signal, and M is an integer greater than 1.

In this embodiment, the mobile terminal may obtain azimuths and at least one signal parameter value of all preset satellites when the mobile terminal is at a current location and at a current moment. The current location is referred to as a first location, and the current moment is referred to as a first moment. All the preset satellites are the M preset satellites, M is an integer greater than 1, and the preset satellites may be potential visible satellites in the field. An azimuth of a preset satellite is a horizontal angle in a clockwise direction between a northern end of a standard direction and a connection line of the preset satellite and the mobile terminal, and a value range of the azimuth is 0° to 360°. An elevation angle of a satellite is an angle that is in a vertical plane in which a connection line of the satellite and a mobile terminal is located and that is between the connection line and a horizontal line. If an elevation angle of the satellite that exists when the mobile terminal is at a first location and at a first moment is greater than a preset elevation angle (for example, 10°), the satellite may be referred to as a preset satellite that exists when the mobile terminal is at the first location and at the first moment. That is, if the mobile terminal is not blocked by a building, the mobile terminal can receive, at a current location on the surface of the earth and at a current moment, a signal transmitted by the satellite.

The mobile terminal may obtain an azimuth and an elevation angle of a satellite according to a location (which may be a rough location) of the mobile terminal and coordinates of a satellite, and may obtain the location of the mobile terminal according to a positioning result of a built-in GNSS, or obtain the location of the mobile terminal according to a historical positioning result. The mobile terminal obtains the coordinates of the satellite through calculation according to a navigation model parameter (which is obtained by demodulating a navigation signal) or a local offline ephemeris.

The mobile terminal may further obtain at least one signal parameter value of each preset satellite of the M preset satellites that exists when the mobile terminal is at a first location and at a first moment. Specifically, the mobile terminal may obtain a signal parameter value according to a received satellite signal transmitted by a preset satellite. The signal parameter value may include one of strength of the satellite signal or a carrier-to-noise ratio of the satellite signal. That is, if one signal parameter value of a preset satellite is obtained, the signal parameter value may be strength or a carrier-to-noise ratio of a satellite signal. If two signal parameter values of a preset satellite are obtained, one signal parameter value is strength of a satellite signal, and the other signal parameter value is a carrier-to-noise ratio of a satellite signal.

S102: Sort the M preset satellites according to values of azimuths, and obtain, from the M sorted preset satellites, N satellite combinations that are consecutively arranged and that have signal parameter values less than corresponding preset values, where each satellite combination includes at least one preset satellite, and N is an integer not less than 1.

In this embodiment, after obtaining a signal parameter value and an azimuth of each preset satellite of the M preset satellites, the mobile terminal sorts the M preset satellites according to values of azimuths, for example, sorts the M preset satellites according to an ascending order of azimuths, or sorts the M preset satellites according to a descending order of azimuths. Then, the mobile terminal determines, from the M sorted preset satellites, preset satellites having signal parameter values less than preset values, and then determines preset satellites that are consecutively arranged as a satellite combination. Therefore, N satellite combinations are obtained from all preset satellites having signal parameter values less than corresponding preset values, and each satellite combination includes at least one preset satellite. For example, the M preset satellites are sorted according to values of azimuths, and the M sorted preset satellites may be: a preset satellite 1, a preset satellite 2, a preset satellite 3, a preset satellite 4, . . . , a preset satellite M−3, a preset satellite M−2, a preset satellite M−1, and a preset satellite M. The preset satellite 1 and the preset satellite 2 are consecutively arranged, the preset satellite 2 and the preset satellite 3 are consecutively arranged, the preset satellite M−2 and the preset satellite M−1 are consecutively arranged, and the preset satellite M−1 and the preset satellite M are consecutively arranged. Optionally, the preset satellite 1 and the preset satellite M may be consecutively arranged. If signal parameter values of the preset satellite 1, the preset satellite 2, and the preset satellite 3 are less than preset values, but a signal parameter value of the preset satellite 4 is not less than a preset value, the preset satellite 1, the preset satellite 2, and the preset satellite 3 form a satellite combination. If signal parameter values of the preset satellite M−2 and the preset satellite M−1 are less than corresponding preset values, but signal parameter values of the preset satellite M−3 and the preset satellite M are not less than corresponding preset values, the preset satellite M−2 and the preset satellite M−1 form a satellite combination. If a signal parameter value of the preset satellite 2 is less than a corresponding preset value, but signal parameter values of the preset satellite 1 and the preset satellite 3 are not less than corresponding preset values, the preset satellite 2 forms a satellite combination.

When one signal parameter value of a preset satellite is obtained, that the signal parameter value is less than a corresponding preset value may be: If the signal parameter value is strength of a satellite signal, the strength of the satellite signal is less than a corresponding preset value. If the signal parameter value is a carrier-to-noise ratio of a satellite signal, the carrier-to-noise ratio of the satellite signal is less than a corresponding preset value. When two signal parameter values of a preset satellite are obtained, one signal parameter value is strength of a satellite signal, and the other signal parameter value is a carrier-to-noise ratio of a satellite signal. Alternatively, when the foregoing signal parameter value includes strength of a satellite signal and a carrier-to-noise ratio of a satellite signal, that the signal parameter value is less than a corresponding preset value may be understood as that: Strength and a carrier-to-noise ratio of a satellite signal are respectively less than preset values of the strength and the carrier-to-noise ratio.

Optionally, a preset value corresponding to a first preset satellite is greater than a preset value corresponding to a second preset satellite, the first preset satellite and the second preset satellite are any two preset satellites of the M preset satellites, and an elevation angle of the first preset satellite is greater than an elevation angle of the second preset satellite. An implementation manner of that a signal parameter value of a preset satellite is less than a corresponding preset value may be that: The signal parameter value of the preset satellite is less than a preset value related to an elevation angle of the preset satellite, and the preset value changes with the elevation angle of the preset satellite. That is, each preset satellite has a preset value corresponding to an elevation angle of the preset satellite, and different elevation angles correspond to different preset values.

An example in which a signal parameter value is strength of a satellite signal is used for description. The mobile terminal may determine preset satellites having elevation angles greater than preset elevation angles, sorts the preset satellites according to azimuths of the preset satellites, and labels a preset satellite with a blocking label according to that strength of a satellite signal of the preset satellite is less than a preset value corresponding to an elevation angle of the preset satellite. The blocking label is, for example, "v" in Table 1, and in this way, content in Table 1 is obtained. For example, a satellite having a larger elevation angle has a lower probability of being blocked, and a relatively high preset value may be set. A satellite having a smaller elevation angle has a higher probability of being blocked, and a relatively low preset value may be set. Satellite combinations may be determined according to blocking labels in Table 1. That is, it is determined that a preset satellite corresponding to a satellite identifier ID1 belongs to a satellite combination, that preset satellites corresponding to satellite identifiers ID4, ID5, and ID6 belong to a satellite combination, and the like. A satellite identifier is defined by a GNSS, and is used to distinguish different satellites.

TABLE 1

| Identifier of preset satellite | Block label | Azimuth | Elevation angle | Preset value |
|---|---|---|---|---|
| ID1 | ✓ | $\delta_1$ | $\theta_1$ | $\alpha_1$ |
| ID2 |  | $\delta_2$ | $\theta_2$ | $\alpha_2$ |

TABLE 1-continued

| Identifier of preset satellite | Block label | Azimuth | Elevation angle | Preset value |
|---|---|---|---|---|
| ID3 |  | $\delta_3$ | $\theta_3$ | $\alpha_3$ |
| ID4 | ✓ | $\delta_4$ | $\theta_4$ | $\alpha_4$ |
| ID5 | ✓ | $\delta_5$ | $\theta_5$ | $\alpha_5$ |
| ID6 | ✓ | $\delta_6$ | $\theta_6$ | $\alpha_6$ |
| . . . | . . . | . . . | . . . | . . . |

S103: Determine a quantity of preset satellites in a first satellite combination of the N satellite combinations, where the first satellite combination is a satellite combination of the N satellite combinations that includes a largest quantity of preset satellites.

In this embodiment, the mobile terminal may determine, after obtaining N satellite combinations, a quantity of the preset satellites included in the satellite combinations, and determine a satellite combination of the N satellite combinations that includes a largest quantity of preset satellites. The satellite combination is referred to as a first satellite combination, and a quantity of the preset satellites in the first satellite combination is further determined. There may be at least one satellite combination of the N satellite combinations that includes a largest quantity of preset satellites. If there are multiple satellite combinations of the N satellite combinations that include a largest quantity of preset satellites, any of the satellite combinations may be selected as the first satellite combination.

S104: When a ratio of the quantity of the preset satellites in the first satellite combination to M is less than a first threshold, set a positioning mode to an outdoor positioning mode; or when a ratio of the quantity of the preset satellites in the first satellite combination to M is greater than a second threshold, set the positioning mode to an indoor positioning mode, where the first threshold is not greater than the second threshold.

Optionally, the first threshold is equal to the second threshold.

In this embodiment, the mobile terminal obtains, after determining a quantity of preset satellites in the first satellite combination, a ratio of the quantity of the preset satellites in the first satellite combination to M, and compares the ratio of the quantity of the preset satellites in the first satellite combination to M with a first threshold and/or a second threshold. When the ratio of the quantity of the preset satellites in the first satellite combination to M is less than the first threshold, it may be determined that the mobile terminal is located outdoors, and a positioning mode is set to an outdoor positioning mode; and when the ratio of the quantity of the preset satellites in the first satellite combination to M is greater than the second threshold, it may be determined that the mobile terminal becomes located indoors, and the positioning mode is set to an indoor positioning mode. Optionally, when the ratio of the quantity of the preset satellites in the first satellite combination to M is not less than the first threshold and is not greater than the second threshold, it may be determined that the mobile terminal is about to be located indoors, and the positioning mode is set to an outdoor positioning mode and an indoor positioning mode.

That the mobile terminal sets a positioning mode to an outdoor positioning mode may be specifically: turning on, by the mobile terminal, a GNSS module, and turning off a Bluetooth module; and optionally, turning on, by the mobile terminal, a WLAN module and/or an inertial sensor.

That the mobile terminal sets the positioning mode to an indoor positioning mode may be specifically: turning off, by the mobile terminal, a GNSS module, or, setting, by the mobile terminal, that the GNSS module enters a low-power consumption mode, and further turning on, by the mobile terminal, at least one of a WLAN module, an inertial sensor, or a Bluetooth module.

According to the method for setting a positioning mode provided in this embodiment of the present invention, an azimuth and at least one signal parameter value of each preset satellite of M preset satellites that exist when a mobile terminal is at a first location and at a first moment are obtained; the M preset satellites are sorted according to values of azimuths, N satellite combinations that are consecutively arranged and that have signal parameter values less than corresponding preset values are obtained from the M sorted preset satellites, and a satellite combination of N satellite combinations that includes a largest quantity of preset satellites is determined; and a ratio of a quantity of preset satellites in the satellite combination to M is compared with a first threshold and a second threshold, to determine whether the mobile terminal is located indoors or outdoors, and then a corresponding positioning mode is set, thereby reducing a probability of incorrectly determining that a mobile terminal is located indoors while the mobile terminal is located outdoors, and improving positioning accuracy.

Figure 2:
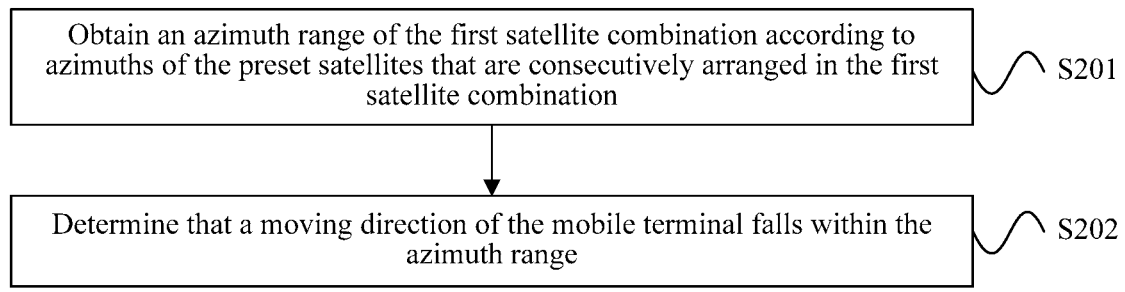
FIG. 2 is a flowchart of Embodiment 2 of a method for setting a positioning mode according to the present invention.

FIG. 2 is a flowchart of Embodiment 2 of a method for setting a positioning mode according to the present invention. As shown in FIG. 2, on the basis of Embodiment 1 of the method of the present invention, when a quantity of satellite combinations (that is, the first satellite combination) including a largest quantity of potential visible satellites of the foregoing N satellite combinations is 1, after S104 is performed, the method in this embodiment may further include:

S201: Obtain an azimuth range of the first satellite combination according to azimuths of the preset satellites that are consecutively arranged in the first satellite combination.

S202: Determine that a moving direction of the mobile terminal falls within the azimuth range.

In this embodiment, the mobile terminal may obtain an azimuth range of a first satellite combination according to azimuths of preset satellites that are consecutively arranged in the first satellite combination. For example, if azimuths of preset satellites that are consecutively arranged in the first satellite combination are 10°, 15°, 20°, and 35° respectively, it may be determined that the azimuth range of the first satellite combination is 10° to 35°. If azimuths of preset satellites that are consecutively arranged in the first satellite combination are 340°, 355°, 10°, 15°, and 20° respectively, it may be determined that the azimuth range of the first satellite combination is 340° to 360° and 0° to 20°. The mobile terminal may then determine that a moving direction of the mobile terminal falls within the azimuth range of the first satellite combination.

When the mobile terminal sets a positioning mode to an indoor positioning mode, in an operation process of switching an outdoor positioning mode to an indoor positioning mode, there may be an operation involving entry into a specific building, for example, switching an outdoor map to an indoor map; and the mobile terminal may estimate, according to the azimuth range of the first satellite combination, a direction in which the mobile terminal enters the building, and then can provide, in combination with the map, assistance information about which building the mobile terminal is to enter.

Optionally, the mobile terminal may further determine confidence of a moving direction of the mobile terminal according to a difference of quantities of preset satellites between satellite combinations of the N satellite combinations. For example, when a quantity of satellites of only one satellite combination is far greater than quantities of satellites of the rest satellite combinations, it is considered that confidence of the moving direction of the mobile terminal is relatively high. When there is no distinct difference between quantities of preset satellites in the satellite combinations, it is considered that confidence of the moving direction of the mobile terminal is relatively low.

The method for setting a positioning mode provided in this embodiment reduces a probability of incorrectly determining that a mobile terminal is located indoors while the mobile terminal is located outdoors, thereby improving positioning accuracy, and can determine a moving direction of a mobile terminal.

In Embodiment 3 of the method for setting a positioning mode of the present invention, on the basis of Embodiment 1 or 2 of the method of the present invention, the method in this embodiment may further include:

when a location interval between a second location and the first location is greater than a first preset distance and less than a second preset distance, and/or, a time interval between a second moment and the first moment is greater than a first time interval and less than a second time interval, obtaining at least one signal parameter value of each preset satellite of the M preset satellites that exists when the mobile terminal is at the second location and at the second moment; and performing, according to the at least one signal parameter value of each preset satellite of the M preset satellites that exists when the mobile terminal is at the second location and at the second moment, and an azimuth of each preset satellite of the M preset satellites that exists when the mobile terminal is at the first location and at the first moment, again a process of setting the positioning mode.

In this embodiment, after the mobile terminal performs S104, if a current location of the mobile terminal is a second location, and a current moment is a second moment, when any one of the following conditions is met: when the location interval between the second location and the first location is greater than the first preset distance and less than the second preset distance, and the time interval between the second moment and the first moment is greater than the first time interval and less than the second time interval, the mobile terminal obtains at least one signal parameter value of each preset satellite of the M preset satellites when the mobile terminal is in a second location and at a second moment; and then performs, according to the at least one signal parameter value of each preset satellite of the M preset satellites that exists when the mobile terminal is at the second location and at the second moment, and an azimuth of each preset satellite of the M preset satellites that exists when the mobile terminal is at the first location and at the first moment, again a process of setting the positioning mode. The process is specifically: comparing, by the mobile terminal, a signal parameter value of each preset satellite of the M preset satellites that exists when the mobile terminal is at the second location and at the second moment with a preset value; then obtaining, from the M sorted preset satellites, H satellite combinations that are consecutively arranged and that have signal parameter values less than corresponding preset values, where H is an integer not less than 1, and each satellite combination includes at least one preset satellite; then determining, from the obtained H satellite combinations, a second satellite combination including a largest quantity of preset satellites; when a ratio of a quantity of preset satellites in the second satellite combination to M is less than a first threshold, setting the positioning mode to an outdoor positioning mode; and when the ratio of the quantity of the preset satellites in the second satellite combination to M is greater than a second threshold, setting the positioning mode to an indoor positioning mode.

In this embodiment, a probability of incorrectly determining that a mobile terminal is located indoors while the mobile terminal is located outdoors is further reduced by using the foregoing solution, thereby improving positioning accuracy.

Optionally, for different preset location areas, a preset satellite corresponding to each preset location area is set. For example, when the mobile terminal is located at any location in a first preset location area, an azimuth and a signal parameter value of a preset satellite that are obtained by the mobile terminal are an azimuth and a signal parameter value of a preset satellite corresponding to the first preset location area. If the foregoing first location and second location both belong to the first preset location area, the preset satellite corresponding to the first preset location area is the foregoing M preset satellites. If the mobile terminal leaves the first preset location area and enters a second preset location area, the mobile terminal sets a positioning mode by using a preset satellite (for example, K preset satellites) corresponding to the second preset location area. For a specific implementation process, refer to related description of setting a positioning mode by using the M preset satellites in the foregoing method embodiments of the present invention, and details are not described herein again.

Optionally, in the foregoing method embodiments of the present invention, when a ratio of the quantity of the preset satellites in the first satellite combination to M is less than the first threshold, the mobile terminal sets the positioning mode to an outdoor positioning mode; and when the ratio of the quantity of the preset satellites in the first satellite combination to M is greater than the second threshold, the mobile terminal sets the positioning mode to an indoor positioning mode. An implementation manner of the process may be:

For a ratio of a quantity of preset satellites included in a satellite combination that includes a largest quantity of preset satellites and that is of satellite combinations obtained by the mobile terminal for the first T times to a corresponding quantity of all the preset satellites, if the foregoing ratio that is obtained for a first preset quantity of times (for example, 3 times) is less than the first threshold, the mobile terminal sets the positioning mode to an outdoor positioning mode; and for the ratio of the quantity of preset satellites included in a satellite combination that includes a largest quantity of preset satellites and that is of satellite combinations obtained by the mobile terminal for the first T times to the corresponding quantity of all the preset satellites, if the foregoing ratio that is obtained for a second preset quantity of times (for example, 3 times) is greater than the second threshold, the mobile terminal sets the positioning mode to an indoor positioning mode.

Figure 3:
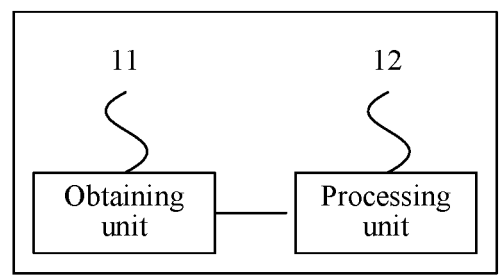
FIG. 3 is a schematic structural diagram of Embodiment 1 of a mobile terminal according to the present invention.

FIG. 3 is a schematic structural diagram of Embodiment 1 of a mobile terminal according to the present invention. As shown in FIG. 3, a mobile terminal in this embodiment may include an obtaining unit 11 and a processing unit 12.

The obtaining unit 11 is configured to obtain an azimuth and at least one signal parameter value of each preset satellite of M preset satellites that exist when the mobile terminal is at a first location and at a first moment, where the signal parameter value includes one of a carrier-to-noise ratio of a satellite signal or strength of a satellite signal, and M is an integer greater than 1.

The processing unit 12 is configured to: sort the M preset satellites according to values of azimuths, and obtain, from the M sorted preset satellites, N satellite combinations that are consecutively arranged and that have signal parameter values less than corresponding preset values, where N is an integer not less than 1, and each satellite combination includes at least one preset satellite; determine a quantity of preset satellites in a first satellite combination of the N satellite combinations, where the first satellite combination is a satellite combination of the N satellite combinations that includes a largest quantity of preset satellites; when a ratio of the quantity of the preset satellites in the first satellite combination to M is less than a first threshold, set the positioning mode to an outdoor positioning mode; or when a ratio of the quantity of the preset satellites in the first satellite combination to M is greater than a second threshold, set the positioning mode to an indoor positioning mode.

The first threshold is not greater than the second threshold.

Optionally, a preset value corresponding to a first preset satellite is greater than a preset value corresponding to a second preset satellite, the first preset satellite and the second preset satellite are any two preset satellites of the M preset satellites, and an elevation angle of the first preset satellite is greater than an elevation angle of the second preset satellite.

Optionally, when a quantity of first satellite combinations of the N satellite combinations is 1, the obtaining unit 11 is further configured to obtain an azimuth range of the first satellite combination according to azimuths of preset satellites that are consecutively arranged in the first satellite combination; and the processing unit 12 is further configured to determine that a moving direction of the mobile terminal falls within the azimuth range.

Optionally, the obtaining unit 11 is further configured to: after the processing unit 12 sets the positioning mode to the outdoor positioning mode or sets the positioning mode to the indoor positioning mode, when a location interval between a second location and the first location is greater than a first preset distance and less than a second preset distance, and/or, a time interval between a second moment and a first moment is greater than a first time interval and less than a second time interval, obtain at least one signal parameter value of each preset satellite of the M preset satellites that exists when the mobile terminal is at the second location and at the second moment, where the second preset distance is greater than the first preset distance, and the second preset time interval is greater than the first preset time interval.

The processing unit 12 is further configured to perform, according to the at least one signal parameter value of each preset satellite of the M preset satellites that exists when the mobile terminal is at the second location and at the second moment, and an azimuth of each preset satellite of the M preset satellites that exists when the mobile terminal is at the first location and at the first moment, again a process of setting the positioning mode.

The mobile terminal in this embodiment may be used to perform the technical solutions of the foregoing method embodiments of the present invention, the implementation principles and technical effects are similar, and details are not described herein again.

Figure 4:
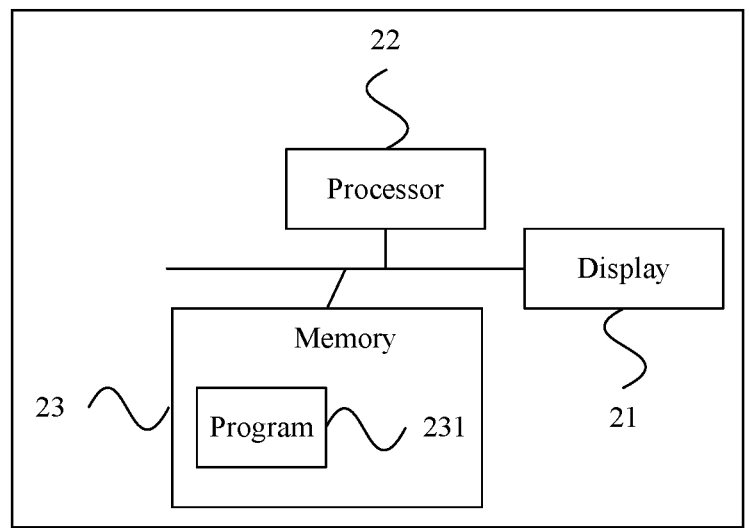
FIG. 4 is a schematic structural diagram of Embodiment 2 of a mobile terminal according to the present invention.

FIG. 4 is a schematic structural diagram of Embodiment 2 of a mobile terminal according to the present invention. As shown in FIG. 4, the mobile terminal includes:

a display 21, one or more processors 22, a memory 23, and one or more programs 231, where the one or more programs 231 are stored in the memory 23 and configured to be performed by the one or more processors 22, and the one or more programs 231 include an instruction used to perform the following methods:

obtaining an azimuth and at least one signal parameter value of each preset satellite of M preset satellites that exist when the mobile terminal is at a first location and at a first moment, where the signal parameter value includes one of a carrier-to-noise ratio of a satellite signal or strength of a satellite signal, and M is an integer greater than 1;

sorting the M preset satellites according to values of azimuths, and obtaining, from the M sorted preset satellites, N satellite combinations that are consecutively arranged and that have signal parameter values less than corresponding preset values, where N is an integer not less than 1, and each satellite combination includes at least one preset satellite;

determining a quantity of preset satellites in a first satellite combination of the N satellite combinations, where the first satellite combination is a satellite combination of the N satellite combinations that includes a largest quantity of preset satellites;

when a ratio of the quantity of the preset satellites in the first satellite combination to M is less than a first threshold, setting the positioning mode to an outdoor positioning mode; or when a ratio of the quantity of the preset satellites in the first satellite combination to M is greater than a second threshold, setting the positioning mode to an indoor positioning mode.

The first threshold is not greater than the second threshold. Optionally, a preset value corresponding to a first preset satellite is greater than a preset value corresponding to a second preset satellite, the first preset satellite and the second preset satellite are any two preset satellites of the M preset satellites, and an elevation angle of the first preset satellite is greater than an elevation angle of the second preset satellite.

Optionally, when a quantity of first satellite combinations of the N satellite combinations is 1, the method further includes: obtaining an azimuth range of the first satellite combination according to azimuths of preset satellites that are consecutively arranged in the first satellite combination; and determining that a moving direction of the mobile terminal falls within the azimuth range.

Optionally, after the setting the positioning mode to an outdoor positioning mode or setting the positioning mode to an indoor positioning mode, the method further includes:

when a location interval between a second location and the first location is greater than a first preset distance and less than a second preset distance, and/or, a time interval between a second moment and the first moment is greater than a first time interval and less than a second time interval, obtaining at least one signal parameter value of each preset satellite of the M preset satellites that exists when the mobile terminal is at the second location and at the second moment, where the second preset distance is greater than the first preset distance, and the second preset time interval is greater than the first preset time interval; and performing, according to the at least one signal parameter value of each preset satellite of the M preset satellites that exists when the mobile terminal is at the second location and at the second moment, and an azimuth of each preset satellite of the M preset satellites that exists when the mobile terminal is at the first location and at the first moment, again a process of setting the positioning mode.

It should be noted that, FIG. 4 shows only one processor 22, but a mobile terminal that is not limited to this embodiment includes one or more processors 22; and FIG. 4 shows only one program 231, but a mobile terminal that is not limited to this embodiment includes one or more programs 231.

The mobile terminal in this embodiment may be used to perform the technical solutions of the foregoing method embodiments of the present invention, the implementation principles and technical effects are similar, and details are not described herein again.

In Embodiment 1 of a computer readable storage medium provided of the present invention, the computer readable storage medium stores one or more programs, the one or more programs include instructions, and the instructions drive, when being performed by a mobile terminal including a display, the mobile terminal to perform the solutions shown in the foregoing method embodiments of the present invention.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (English: Read-Only Memory, ROM for short), a random access memory (English: Random Access Memory, RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for setting a positioning mode for a mobile terminal, comprising:
   obtaining an azimuth and a signal parameter value of each preset satellite of M preset satellites when the mobile terminal is at a first location, wherein the each preset satellite has a corresponding preset value, and M is an integer greater than 1;
   sorting the M preset satellites according to values of azimuths of the M preset satellites;
   obtaining, from the M sorted preset satellites, N satellite combinations, wherein each of the N satellite combinations includes consecutively arranged sorted preset satellites, wherein each particular preset satellite in a satellite combination has a signal parameter value less than a corresponding preset value of the particular preset satellite, wherein N is an integer greater than or equal to 1, and wherein each satellite combination comprises at least one preset satellite;
   determining a quantity of preset satellites in a first satellite combination of the N satellite combinations, wherein the first satellite combination is a satellite combination comprising a largest quantity of preset satellites of the N satellite combinations;
   calculating a ratio of the quantity of the preset satellites in the first satellite combination to M; and in response to determining that the ratio of the quantity of the preset satellites in the first satellite combination to M is less than a first threshold, setting the positioning mode to an outdoor positioning mode; or in response to determining that the ratio of the quantity of the preset satellites in the first satellite combination to M is greater than a second threshold, setting the positioning mode to an indoor positioning mode, wherein the first threshold is less than or equal to the second threshold;

wherein the mobile terminal sets the positioning mode to the outdoor positioning mode or the indoor positioning mode when the mobile terminal is at the first location and at a first moment, wherein the mobile terminal further moves to a second location at a second moment, and wherein the method further comprises:

in response to determining that at least one of a location interval between the second location and the first location is greater than a first preset distance and less than a second preset distance, or, a time interval between the second moment and the first moment is greater than a first preset time interval and less than a second preset time interval, obtaining the signal parameter values of the M preset satellites when the mobile terminal is at the second location and at the second moment, wherein the second preset distance is greater than the first preset distance, and wherein the second preset time interval is greater than the first preset time interval; and setting a second positioning mode for the mobile terminal based on the signal parameter values of the M preset satellites when the mobile terminal is at the second location and at the second moment, and the azimuths of the M preset satellites when the mobile terminal is at the first location and at the first moment.

2. The method according to claim 1 wherein a preset value corresponding to a first preset satellite is greater than a preset value corresponding to a second preset satellite, the first preset satellite and the second preset satellite are two preset satellites of the M preset satellites, and an elevation angle of the first preset satellite is greater than an elevation angle of the second preset satellite.

3. The method according to claim 1, wherein when a quantity of first satellite combinations of the N satellite combinations is 1, the method further comprises:
obtaining an azimuth range of the first satellite combination according to azimuths of the preset satellites that are consecutively arranged in the first satellite combination; and
determining that a moving direction of the mobile terminal falls within the azimuth range.

4. The method according to claim 1, wherein the signal parameter value comprises one of a carrier-to-noise ratio of a satellite signal or a strength of the satellite signal.

5. The method according to claim 1, wherein the mobile terminal comprises multiple application programs.

6. A mobile terminal, comprising:
one or more hardware processors; and
a non-transitory computer-readable storage medium coupled to the one or more hardware processors and storing programming instructions for execution by the one or more hardware processors, wherein the programming instructions instruct the one or more hardware processors to:
obtain an azimuth and a signal parameter value of each preset satellite of M preset satellites when the mobile terminal is at a first location, wherein the each preset satellite has a corresponding preset value, and M is an integer greater than 1;
sort the M preset satellites according to values of azimuths of the M preset satellites;
obtain, from the M sorted preset satellites, N satellite combinations, wherein each of the N satellite combinations includes consecutively arranged sorted preset satellites, wherein each particular preset satellite in a satellite combination has a signal parameter value less than a corresponding preset value of the particular preset satellite, wherein N is an integer greater than or equal to 1, and wherein each satellite combination comprises at least one preset satellite;
determine a quantity of preset satellites in a first satellite combination of the N satellite combinations, wherein the first satellite combination is a satellite combination comprising a largest quantity of preset satellites of the N satellite combinations;
calculate a ratio of the quantity of the preset satellites in the first satellite combination to M; and
in response to determining that the ratio of the quantity of the preset satellites in the first satellite combination to M is less than a first threshold, setting the positioning mode to an outdoor positioning mode; or
in response to determining that the ratio of the quantity of the preset satellites in the first satellite combination to M is greater than a second threshold, setting the positioning mode to an indoor positioning mode, wherein the first threshold is less than or equal to the second threshold;
wherein the mobile terminal sets the positioning mode to the outdoor positioning mode or the indoor positioning mode when the mobile terminal is at the first location and at a first moment, wherein the mobile terminal further moves to a second location at a second moment, and wherein the programming instructions further instruct the one or more hardware processors to:
in response to determining that at least one of a location interval between the second location and the first location is greater than a first preset distance and less than a second preset distance, or, a time interval between the second moment and the first moment is greater than a first preset time interval and less than a second preset time interval, obtain the signal parameter values of the M preset satellites when the mobile terminal is at the second location and at the second moment, wherein the second preset distance is greater than the first preset distance, and wherein the second preset time interval is greater than the first preset time interval; and
set a second positioning mode for the mobile terminal based on the signal parameter values of the M preset satellites when the mobile terminal is at the second location and at the second moment, and the azimuths of the M preset satellites when the mobile terminal is at the first location and at the first moment.

7. The mobile terminal according to claim 6, wherein a preset value corresponding to a first preset satellite is greater than a preset value corresponding to a second preset satellite, the first preset satellite and the second preset satellite are two preset satellites of the M preset satellites, and an elevation angle of the first preset satellite is greater than an elevation angle of the second preset satellite.

8. The mobile terminal according to claim 6, wherein when a quantity of first satellite combinations of the N satellite combinations is 1, wherein the programming instructions further instruct the one or more hardware processors to:
    obtain an azimuth range of the first satellite combination according to azimuths of the preset satellites that are consecutively arranged in the first satellite combination; and
    determine that a moving direction of the mobile terminal falls within the azimuth range.

9. The mobile terminal according to claim 6, wherein the signal parameter value comprises one of a carrier-to-noise ratio of a satellite signal or a strength of the satellite signal.

10. The mobile terminal according to claim 6, wherein the mobile terminal comprises multiple application programs.

11. A non-transitory computer readable storage medium storing computer instructions, when executed by one or more hardware processors of a mobile terminal, cause the one or more hardware processors to perform operations comprising:
    obtaining an azimuth and a signal parameter value of each preset satellite of M preset satellites when the mobile terminal is at a first location, wherein each preset satellite has a corresponding preset value, and M is an integer greater than 1;
    sorting the M preset satellites according to values of azimuths of the M preset satellites;
    obtaining, from the M sorted preset satellites, N satellite combinations, wherein each of the N satellite combinations includes consecutively arranged sorted preset satellites, wherein each particular preset satellite in a satellite combination has a signal parameter value less than a corresponding preset value of the particular preset satellite, wherein N is an integer greater than or equal to 1, and wherein each satellite combination comprises at least one preset satellite;
    determining a quantity of preset satellites in a first satellite combination of the N satellite combinations, wherein the first satellite combination is a satellite combination comprising a largest quantity of preset satellites of the N satellite combinations;
    calculating a ratio of the quantity of the preset satellites in the first satellite combination to M; and
    in response to determining that the ratio of the quantity of the preset satellites in the first satellite combination to M is less than a first threshold, setting the positioning mode to an outdoor positioning mode; or
    in response to determining that the ratio of the quantity of the preset satellites in the first satellite combination to M is greater than a second threshold, setting the positioning mode to an indoor positioning mode, wherein the first threshold is less than or equal to the second threshold;
    wherein the mobile terminal sets the positioning mode to the outdoor positioning mode or the indoor positioning mode when the mobile terminal is at the first location and at a first moment, wherein the mobile terminal further moves to a second location at a second moment, and wherein the operations further comprise:
    in response to determining that at least one of a location interval between the second location and the first location is greater than a first preset distance and less than a second preset distance, or, a time interval between the second moment and the first moment is greater than a first preset time interval and less than a second preset time interval, obtaining the signal parameter values of the M preset satellites when the mobile terminal is at the second location and at the second moment, wherein the second preset distance is greater than the first preset distance, and wherein the second preset time interval is greater than the first preset time interval; and
    setting a second positioning mode for the mobile terminal based on the signal parameter values of the M preset satellites when the mobile terminal is at the second location and at the second moment, and the azimuths of the M preset satellites when the mobile terminal is at the first location and at the first moment.

12. The non-transitory computer readable storage medium according to claim 11, wherein a preset value corresponding to a first preset satellite is greater than a preset value corresponding to a second preset satellite, the first preset satellite and the second preset satellite are two preset satellites of the M preset satellites, and an elevation angle of the first preset satellite is greater than an elevation angle of the second preset satellite.

13. The non-transitory computer readable storage medium according to claim 11, wherein when a quantity of first satellite combinations of the N satellite combinations is 1, wherein the operations further comprise:
    obtaining an azimuth range of the first satellite combination according to azimuths of the preset satellites that are consecutively arranged in the first satellite combination; and
    determining that a moving direction of the mobile terminal falls within the azimuth range.

14. The non-transitory computer readable storage medium according to claim 11, wherein the signal parameter value comprises one of a carrier-to-noise ratio of a satellite signal or a strength of the satellite signal.

15. The non-transitory computer readable storage medium according to claim 11, wherein the mobile terminal comprises multiple application programs.

* * * * *